(12) United States Patent
Van Sant et al.

(10) Patent No.: US 6,320,610 B1
(45) Date of Patent: Nov. 20, 2001

(54) COMPACT IMAGING DEVICE INCORPORATING ROTATABLY MOUNTED CAMERAS

(75) Inventors: Glen Van Sant, Langhorne; Michael Negin, Tabernacle, both of PA (US); John Drozd, Mt. Ephraim, NJ (US); Thomas A. Chmielewski, Jr., Langhorne, PA (US); Kevin Carl Kaighn, Mount Laurel, NJ (US)

(73) Assignee: Sensar, Inc., Moorsetown, NJ (US)

( * ) Notice: Subject to any disclaimer, the term of this patent is extended or adjusted under 35 U.S.C. 154(b) by 0 days.

(21) Appl. No.: 09/224,544

(22) Filed: Dec. 31, 1998

(51) Int. Cl.[7] .......................... H04N 13/02; H04N 7/18; H04N 5/225; G06K 9/36

(52) U.S. Cl. ........................... 348/143; 348/48; 348/373; 382/291

(58) Field of Search .................. 348/42, 47, 77, 348/78, 143, 156, 159, 48, 61, 150, 151; 382/117, 118, 291, 103; 340/571, 545.6, 425, 426

(56) References Cited

U.S. PATENT DOCUMENTS

| 3,533,683 | 10/1970 | Stark et al. ............... 351/1 |
| 3,598,107 | 8/1971 | Ishikawa ................. 128/2 |
| 3,600,098 | 8/1971 | Mohrman .............. 356/153 |
| 4,620,318 | 10/1986 | Hill ......................... 382/2 |
| 4,623,930 | 11/1986 | Oshima et al. ....... 358/222 |
| 4,641,349 | 2/1987 | Flom et al. ............... 382/2 |
| 4,920,367 | * 4/1990 | Pagano ................... 354/81 |
| 5,016,282 | 5/1991 | Tomono et al. .......... 382/2 |
| 5,291,560 | 3/1994 | Daugman ................. 382/2 |
| 5,499,303 | 3/1996 | Hundt et al. ......... 382/100 |
| 5,717,512 | * 2/1998 | Chmielewski, Jr. et al. ....... 359/210 |
| 5,801,763 | 9/1998 | Suzuki ..................... 348/77 |
| 6,069,967 | * 5/2000 | Rozmus et al. ....... 382/117 |
| 6,118,888 | * 9/2000 | Chino et al. .......... 382/118 |

FOREIGN PATENT DOCUMENTS

| 196 39 728 A 1 | 4/1998 | (DE) . |
| 09212644 | 8/1997 | (JP) . |
| 10137223 | 5/1998 | (JP) . |

* cited by examiner

Primary Examiner—Wendy R. Garber
Assistant Examiner—Rashawn N. Tillery
(74) Attorney, Agent, or Firm—Woodcock Washburn Kurtz Mackiewicz & Norris LLP

(57) ABSTRACT

A compact image steering and focusing device has a generally rectangular frame containing at least one illuminator and at least one and preferably two cameras and a pan/tilt mirror on a tilting frame. There is a tilt axis through the frame. A tilt motor is attached to the frame to turn the frame about the tilt axis. Another camera is positioned in optical alignment with the pan/tilt mirror. The device can fit behind the cover plate of an automated teller machine. Images from the cameras on the titling frame are used to focus the other camera on one eye of the automated teller machine user to identify the user by iris analysis and comparison to an iris image or iris code on file.

39 Claims, 9 Drawing Sheets

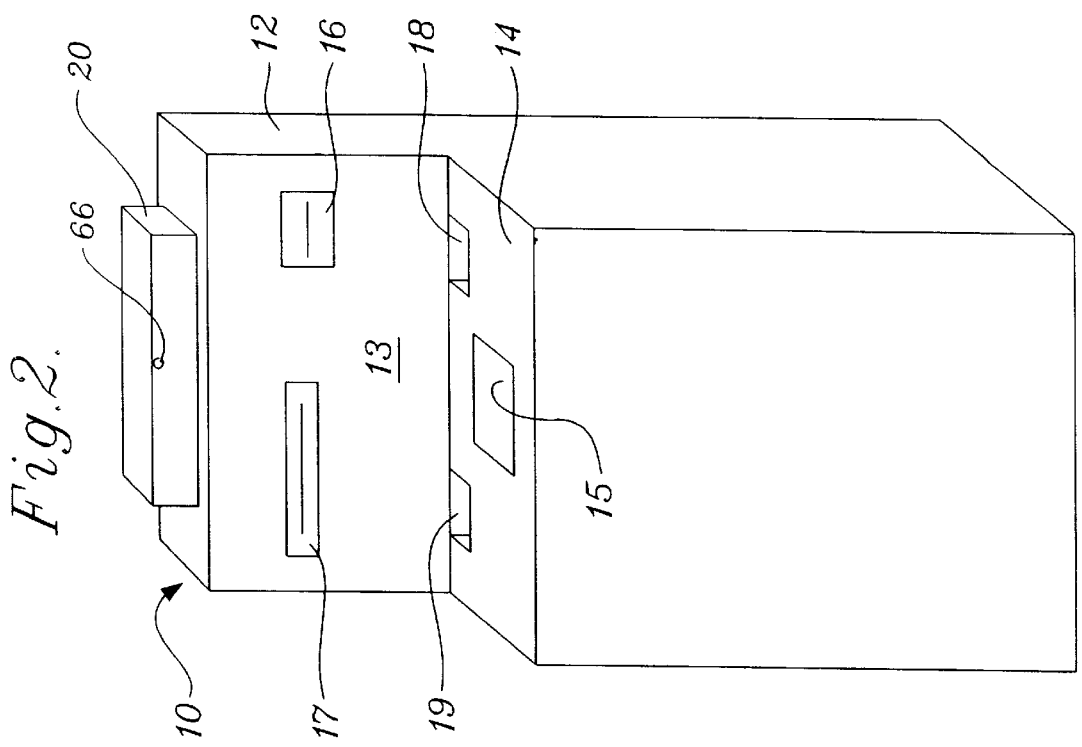
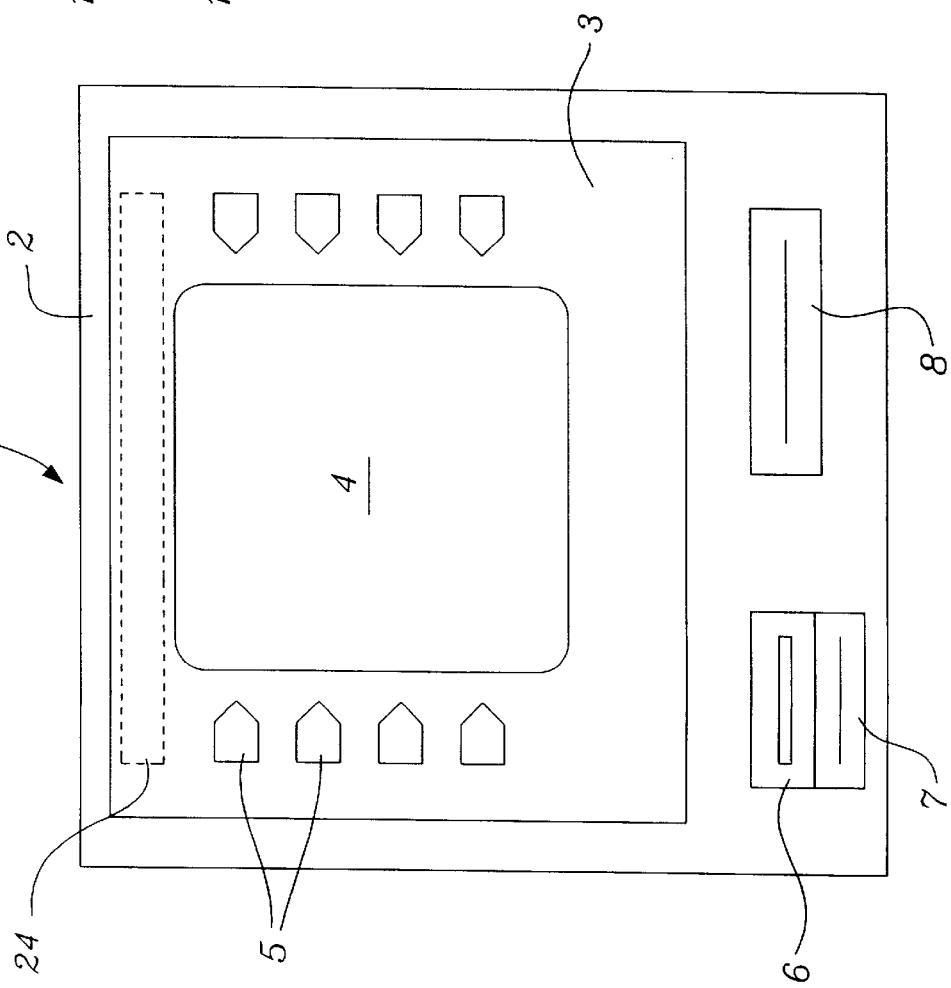

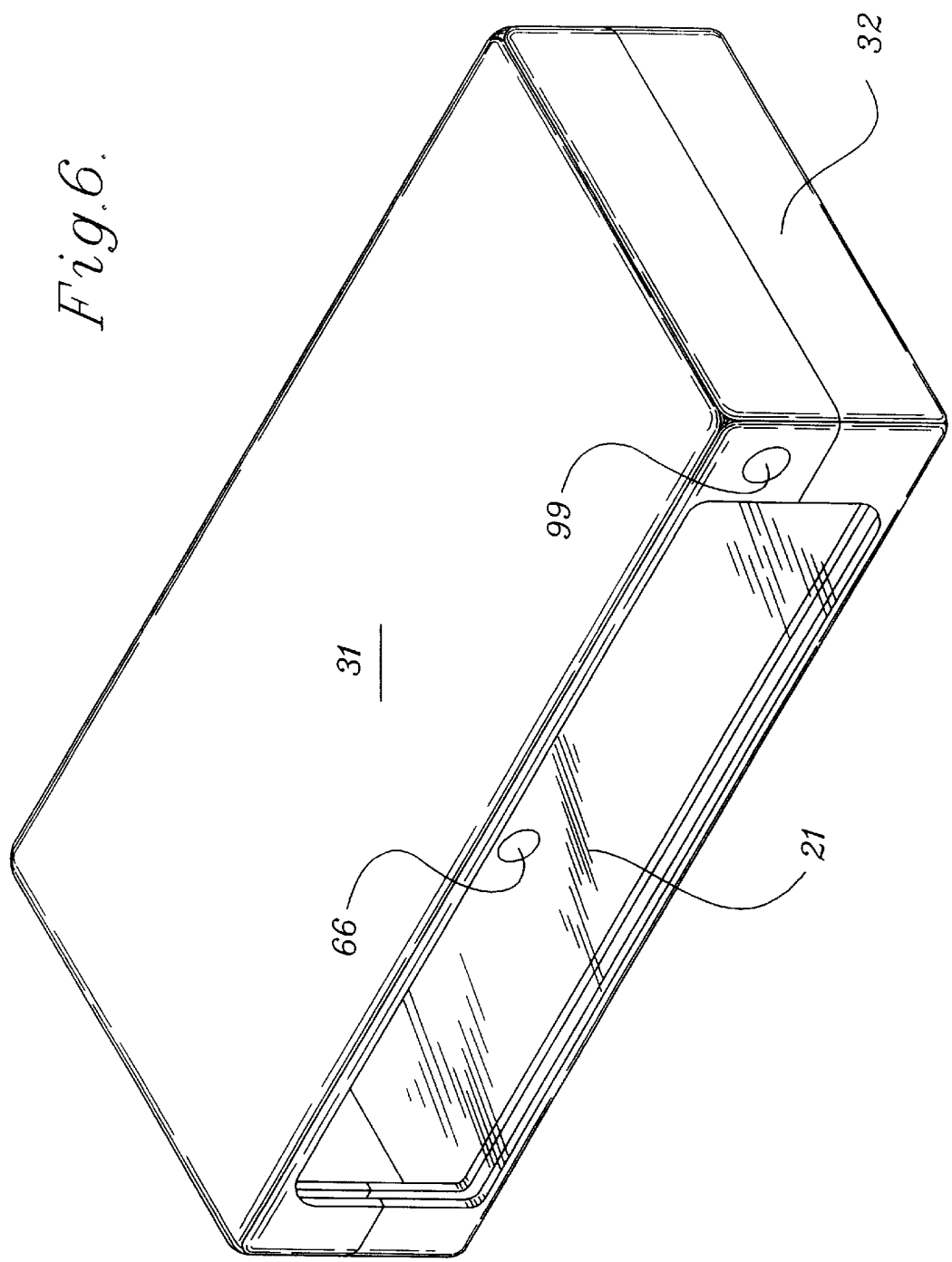

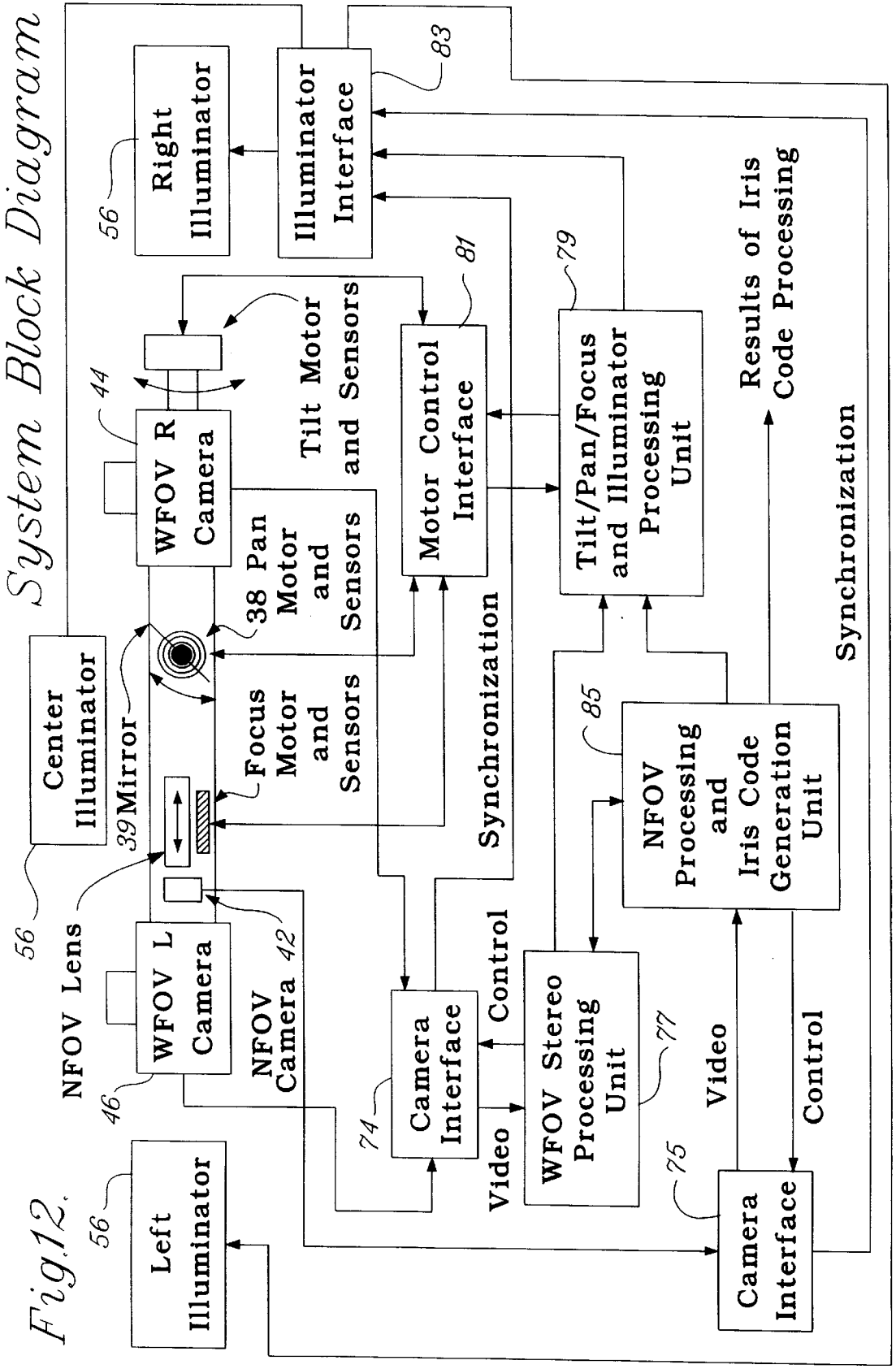
Fig. 12. System Block Diagram

COMPACT IMAGING DEVICE INCORPORATING ROTATABLY MOUNTED CAMERAS

BACKGROUND OF THE INVENTION

1. Field of the Invention

The invention relates to a device for intelligently directing light to a particular object in a scene and then directing the light reflected from the object into an imaging camera.

2. Background of the Invention

There are several methods known as biometrics used for verifying or recognizing the identity an individual. Verification is a one-to-one process in which a computed biometric code from an individual is compared to a single previously stored biometric code to determine if the person is who he or she claims to be. Recognition is a one-to-many process in which a computed biometric code from an individual is compared to a data base of many different individuals' biometric codes with the objective of determining the identity of the individual. Biometric methods include analyzing a signature, obtaining and analyzing an image of a fingerprint and imaging and analyzing the retinal vascular patterns of a human eye. Recently, the art has used the iris of the eye which contains a highly detailed pattern that is unique for each individual and stable over many years as a non-contact, non-obtrusive biometric. This technique is described in U.S. Pat. No. 4,641,349 to Flom et al. and U.S. Pat. No. 5,291,560 to Daugman.

The iris identification techniques disclosed by Flom and Daugman require a clear, well-focused image of the iris portion of the eye including a well defined iris sclera boundary. Additionally, the image must be of sufficient size so that it may be encoded properly. The nominal size of the iris must be approximately 200 pixels in diameter for a 640 by 480 by 8 bit digitized image.

In a present commercial embodiment, the IriScan System 2100, manufactured by IriScan of Marlton N.J., an image of the eye is obtained and an iris code is derived from the image. This code is stored along with other data in a file for a particular individual thereby completing an enrollment process. Later, when that same person asks to be verified, a new image of the eye is obtained and used to compute an iris code which is then compared with the iris code on file. In this way, a person's identity can be verified. In order to obtain an enrollment or a verification image the person being identified must keep at least one of their eyes in a fixed position with respect to a single imaging camera which takes a picture of the iris. To accomplish this, the user must look at a either a reflected or real time video image of their eye (i.e. a visual feedback mechanism) and then move their face slightly back and forth or left and right until an aligned, well focused, and complete image is obtained. Since focus is a subjective measurement, image processing software is used to make the final judgment of the focus and positioning of the eye and notifies the user by an audible signal when the user's eye is properly aligned. While this procedure is satisfactory for some applications, it is not satisfactory for quick transactional activities such as using an automated teller machine, automated cash dispensing machine or certain access control applications since it requires cooperation from the user.

However, prior to the present invention or U.S. Pat. No. 5,717,512 to Chmielewski et al, there has not been an optical system which could rapidly acquire a sufficiently clear, properly aligned image of an iris of the person to be identified unless that person positioned his eye in a fixed position relatively close to an imaging camera and performed a self alignment and focus process. Thus, there is a need for an optical system which will rapidly obtain a clear, properly aligned picture of the iris of a person standing remotely from the optical system and in an uncertain position. This system should be as unobtrusive as possible. That is, it should require little or no cooperation by the user (except for looking in the right direction) and not do anything out of the ordinary such as turning on or off bright lights. This type of system would be particularly useful to verify or recognize the users of automated teller machines as well as individuals seeking access to a restricted area or facility or other applications requiring user identification.

Automated teller machines, often called ATMs, are compact, sophisticated devices which have a large number of electrical and electromechanical subsystems arranged in a restricted volume. Cash machines are simpler derivatives of ATMs that only dispense cash. The terms automated teller machine and ATM are used herein to include cash machines. There are small spaces immediately behind the cover plates of these automated machines or around the bezel of the display in which a very compact optical system could be placed. The location and size of that space may differ among automated teller machines. Alternatively, the top surface of the ATMs also provides a convenient location for mounting an optical system. Yet, there are several manufacturers of these machines, two of which are NCR and OKI Electric. Each manufacturer offers several models, but the products in each manufacturer's ATM product line are quite similar. Although there are several basic types of ATMs, the NCR machine and the OKI machine are representative. Any optical system for iris identification of ATM users should be suitable for use either integrated into the ATM or attached to the top of the ATM. In this way the system can accommodate the various types of ATM machines. The system must also be able to rapidly capture a clear image of the iris of the person using the automated teller machine and have the capability of performing the related processing needed for user verification or recognition.

Many automated teller machines and similar financial transaction machines are currently equipped with video cameras typically positioned above the display panel. These video cameras are used to record images of people making transactions and also for general security such as to catch vandals. These cameras are positioned to take a picture of the head and shoulders of the person using the machine. However, these cameras are not equipped to rapidly focus on or image a small region of the user's face. It is not possible for these cameras to obtain a sufficiently detailed image of the iris of the user of the machine which iris image could be used to verify or recognize the user. Therefore, there is a need for an optical system compatible with the ATM within the size constraints and normal use of the machine which can rapidly acquire and provide a clear, detailed image of the iris of the user which image is sufficient for identification of the user based upon iris analysis. Preferably, at least one of the cameras used within this optical system could also serve as a conventional security camera when the device is not in use thereby reducing cost by removing duplicated equipment.

In our U.S. Pat. No. 5,717,512 we describe a compact image steering and focusing device having three cameras and a tilting frame on a flat base. The tilting frame contains a pan/tilt mirror, lens system, focus motor, pan motor, and tilt motor, all of which can direct the field of view seen by one of the cameras. The other two cameras are mounted in fixed locations. The illuminators are also fixed and provide illumination sufficient to image an iris anywhere in the defined working volume. Although this device works well, it has limitations which prevent it from covering a larger imaging volume (i.e., one that is sufficient to image users ranging from the average 7 year old to the 95th percentile male as well as wheelchair bound individuals) in a cost effective manner. Therefore there is a need for a cost effective system that can unobtrusively image the iris of individuals, adaptively compensating for a wide variety of eye heights and also be compact enough to be integrated either into or on top of an ATM or cash machine.

SUMMARY OF THE INVENTION

The present compact image steering device can obtain a clear image of a small region on an object located in a volume bounded by an angle of 82 degrees in the vertical, an angle of 58.5 degrees in the horizontal and a radial distance from 14 inches to 30 inches in front of the optical system. The system includes a tiltable frame which carries a mirror and at least one camera. Light reflected from the object of interest is captured by the mirror and directed to another camera which may or may not be on the tilting frame. A pan motor rotates the mirror around the pan axis. A tilt motor is provided to turn the frame which supports the mirror and its parining mechanism about a tilt axis. The tilt axis is substantially perpendicular to the pan axis of the mirror. The combined tilting of the frame and pan motor motion allows the mirror to be steered to any location in the imaging volume. In a preferred embodiment, a narrow field of view (NFOV) camera receives the light reflected from the pan/tilt mirror. Two cameras are provided on the tilting frame to obtain two spatially separated but time concurrent wide field of view (WFOV) images of the subject. Images from these cameras are processed to determine the coordinates of the specific location of interest, such as the face and eyes of a person to be identified. Based upon an analysis of those images, the tilt axis and pan axis are positioned so that the mirror is adjusted to receive light reflected from the iris or other area of interest and direct that reflected light to a narrow field of view camera and lens system. The NFOV lens system and camera produces an image of sufficient size and quality to permit iris identification. The NFOV camera's field of view is approximately 3 degrees.

Illumination is provided by attaching at least one illuminator to the tilting frame. This first illuminator is aligned so that the center axis of its respective beam pattern is parallel to the optical axis of the WFOV cameras. The beam pattern is designed so that it provides sufficient illumination coverage for the area imaged by the WFOV cameras and optics. As the tilt axis moves up and down, the camera and illumination can image users at various heights. NFOV illumination is provided by two illuminators which are affixed on opposite and extreme ends of the tilting frame. These illuminators' beam patterns are significantly smaller than the WFOV illuminators beam pattern. The optical axis of these two illuminators form a plane through which the optical axis of the of the NFOV camera moves as it pans. Thus the light is directed only to the area of interest (as defined by the field of view of the NFOV camera) and energy is not wasted by illuminating an area larger than necessary In a second embodiment, the NFOV illuminators are provided with a rotational degree of freedom so that they move in the same direction as the pan axis. In this case, the beam pattern of one or both illuminators is steered to coincide with the location of the imaging area of the NFOV camera, as defined by the pan and tilt axes. Here the beam patterns would be sized to be slightly larger than the field of view of the NFOV camera.

A control system is provided to analyze the images from the wide field of view camera and thereby specify the location of a point or area of interest on the object or person being identified. A preferred technique for identifying the position of the user is stereographic image analysis. Alternatively, non-visible range imaging or distance finding devices such as ultrasonic, radar, spread spectrum microwave or thermal imaging or sensing could be used. The control system provides synchronization and timing between cameras and illuminators as well and intensity control for the illuminators. The control system also includes processing software to compute an iris code from the NFOV image and the support to perform verification or identification of the user. The final result of this processing is then passed to the ATM which then allows or disallows the transaction to occur.

The present system can be readily integrated to work with all conventional automated teller machines and many other financial transaction machines. Image acquisition through verification can generally be accomplished in less than three seconds.

Other objects and advantages will become apparent from a description of certain present preferred embodiments shown in the drawings.

BRIEF DESCRIPTION OF THE FIGURES

FIG. 1 is a front view of the face of one type of automated teller machine such as is manufactured by NCR wherein a preferred location of our compact imaging device is shown in chainline.

FIG. 2 is a perspective view of another type of automated teller machine manufactured by OKI Electric with our compact imaging device located on top of the machine.

FIG. 6 is a perspective view similar to FIG. 5 showing the housing which fully encloses the first preferred embodiment of the image sensing and focusing device.

FIG. 12 is a block diagram of the system showing the major functionality and components of the image steering system.

BRIEF DESCRIPTION OF THE PREFERRED EMBODIMENTS

Figure 3:
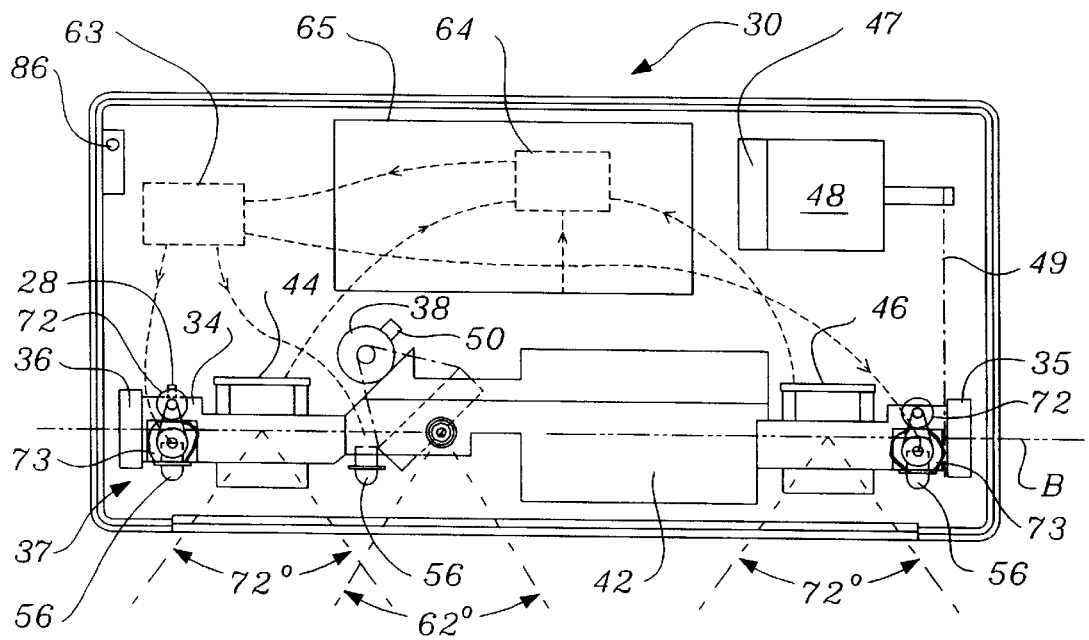
FIG. 3 is a top plan view of a first present preferred embodiment of our image steering device with optional strobing components shown in chain line.

Two basic types of automated teller machines are illustrated in FIGS. 1 and 2. In FIG. 1 there is shown an automated teller machine of the type manufactured by NCR. That machine 1 has a console 2 containing a CRT display 4. Adjacent to the display are transaction selection buttons 5 in a cover plate 3 which surrounds the CRT display 4. A card dip 6 and receipt printer are positioned below the cover plate 3. A currency dispenser 8 is positioned adjacent the card dip. It should be understood that the console could be configured so that the card dip 6, printer 7 and currency dispenser 8 are on the right side or left side of the cover 3. The cabinet for the NCR machine is designed to be positioned in a wall of a building or may be configured as part of a freestanding ATM.

The automated teller machine shown in FIG. 2 is a stand alone device such as is manufactured by OKI Electric. That machine has a cabinet 12 which sits on the floor. The cabinet has a vertical face 13 in which the card dip 16 and a printer 17 are located. The OKI machine 10 also has a counter 14 in which there is a touch type display pad 15. A bill dispenser 18 and coin dispenser 19 are provided on the counter adjacent the upright face 13.

Since the OKI automated teller machine has very limited internal space, the compact image steering device is mounted on the top of the machine in housing 20. In the NCR machine shown in FIG. 1, the volume to accommodate the image steering device is only available directly above the CRT, 4. Therefore we have constructed the device shown in FIGS. 3 through 6 so that the housing is 254 mm (10") deep, 269.3 mm (10.6") wide and 50.8 mm (2") tall. Consequently, the device will fit within the space indicated by dotted line box 24.

Light reflected from the user enters our device through window 21 shown in FIG. 6. Since we prefer to use infrared light for illumination, window 21 can contain an infrared pass filter or infrared bandpass filter. When the device is incorporated into the ATM, we may eliminate the filter in window 21 and place an infrared filter over the opening in the ATM housing. A pan/tilt mirror within our steering device directs light reflecting from the eye of the subject being identified to a narrow field of view camera. A second and possibly third camera take wide field of view images which after processing are used to direct the pan/tilt mirror and illumination sources to image the user's eye. Since a user cannot see through the infrared filter, but infrared light readily passes, the user need not be aware that mechanisms, a camera and optical system are present in the machine behind the opening.

In the context of iris identification, the optical system and cameras are required to perform under computer control. The objective is for the system to provide illumination to the proper location in the work volume so that the wide field of camera(s) can find the head, face and eye of a user standing anywhere in this volume. Once this processing is complete, the {x,y,z} coordinates of the user's right or left eye are known. The {x,y} information is used to direct the pan and tilt axes so that the optical axis of the NFOV camera points to the center user's eye. The {Z} or distance information is used to control the position of the NFOV focusing lenses so that the eye is in focus. Once a focused and centered image is obtained by the NFOV camera the digitized image is passed to a software module to compute the iris code as defined by U.S. Pat. No. 5,291,560. The computed iris code is then compared to the iris code which corresponds to the user. If the codes match the user's identity is verified. Alternatively, the computed iris code could be compared to a file of iris codes. When a match occurs, the user is identified. The comparison of the iris code could be at the financial transaction machine or may be done in a remote location. If the verification or identification processing is performed at a remote location, the iris code must be securely transmitted to the second location and the processing results must be securely returned to the ATM. Of course, the final result is the ATM allowing or disallowing a transaction to occur.

The first present preferred embodiment of our compact image steering and focusing device 30 is shown in FIGS. 3 through 6. In this embodiment, we provide a base 32 and cover 31 which hold window 21. The cover and window are shown most clearly in FIG. 6. Also shown is a circuit board 55 that may be mounted on the base 32 which contains the electronics, interfaces and computer chips that are needed to control the mechanisms, cameras and illuminators. A one piece generally rectangular frame 37 is connected between right upright 35 and left upright 36. A pan/tilt mirror 39 is pivotably attached between the upper and lower arms of frame 37 so it can rotate around pan axis A shown in chain line in FIG. 4. As can be most clearly seen in FIGS. 3 and 5, a pan motor 38 is provided to move the pan/tilt mirror 39 about the pan axis A. A cable drive system is shown connecting the shaft of motor 38 to a bracket (not shown) holding mirror 39, alternatively any other transmission arrangement including anti-backlash spur or even a direct drive approach could also be used to transfer motion. We prefer to provide a pan location indicator switch 40 on the bottom arm of frame 37. This indicating switch will signal the control electronics when the mirror is at an index or reference position or has been rotated a selected amount from some predefined position. Those versed in the art will recognize that this indicator switch provides a means to calibrate the pan position of the pan/tilt mirror with respect to a fixed world coordinate frame.

In the first embodiment we provide a narrow field of view (NFOV) camera assembly 42 on the frame 37 in optical alignment with the pan/tilt mirror. A pair of WFOV cameras 44 and 46 are provided on opposite ends of the frame 37. The centerline of the WFOV cameras 44 and 46 and the centerline of the NFOV camera 42 lie in the same plane. That plane rotates as the frame 37 is moved about the tilt axis B. Since the NFOV camera rotates with the tilt axis, the characteristic rotation of the image seen with a fixed camera and a pan/tilt mirror is not present. The frame is rotated by tilt motor 48 connected through drive belt 49 about tilt axis B. Stepper motors or DC motors with feedback provided by optical encoders or potentiometers 50 and 47 could be used as motors 38 and 48. A tilt position indicating switch 28 can be provided on the frame or uprights to indicate when the frame is at an index or reference position or has been rotated a selected amount from some predefined position. This tilt indicating switch is also used for calibration. Movement of the pan mirror 39 corresponds to the horizontal motion of a user in front of the ATM. Movement of the frame 37 directs the optical axes of the cameras to compensate for the height of the head and eye of the user. As indicated by the angles shown in FIG. 3 on the cameras 44 and 46, the lenses which are integral to the wide field of view cameras provide a horizontal field of view of 72 degrees. FIG. 3 also shows that the optical axis of pan/tilt mirror 39 can be rotated through a horizontal range of 62 degrees, thereby directing the 3 degree field of view of the NFOV camera throughout a plane in the work volume. Thus, the NFOV camera assembly 42 has a field of view which overlaps a subset of the field of view seen by the fixed focus WFOV cameras 44 and 46.

Being able to rotate the pan/tilt mirror 39 around the pan axis A and tilt axis B allows the NFOV camera's field of view to be directed along the pan (left to right) and tilt (up and down) axes. The center of the optical axis passing through the focusing lens intersects with the center of the pan/tilt mirror. The use of a directing mirror has the characteristic that the optical range is twice the mechanical range. In our preferred embodiment the mirror's motion in the pan direction has a total mechanical displacement of 31 degrees and the total mechanical displacement of the tilt axis is 41 degrees. The tilt axis range of motion is not necessarily symmetrical about the horizontal. Due to the mirror, the camera can effectively view a range of 62 degrees optically in the pan direction and a range of 82 degrees optically in the tilt direction. This is a major advantage as compared to mounting a camera and lens on a pan/tilt stage, since less physical motion is required and significantly less weight must be moved.

The two wide field of view (WFOV) cameras move in the tilt direction with the NFOV tilt axis. A larger operational vertical range for WFOV cameras may be acquired by moving the WFOV cameras with the NFOV tilt axis as compared to using a fixed mounting for these cameras. By moving the cameras, a high resolution sensor to match the wide angle lens for coverage and desired resolutions at extreme ranges is not necessary. The WFOV cameras may be designed to use low cost commercial lenses with smaller angular fields of view, such as 60 degrees, as well as low resolution sensors to achieve the desired spatial resolution at the extreme operating ranges. The smaller angle field of view is moved via the tilt axis to achieve the desired range of coverage. This larger range accommodates variations in the users' heights and allows the system to work with wheelchair bound individuals as well as those tall individuals at the 99th percentile of height.

Figure 7A:
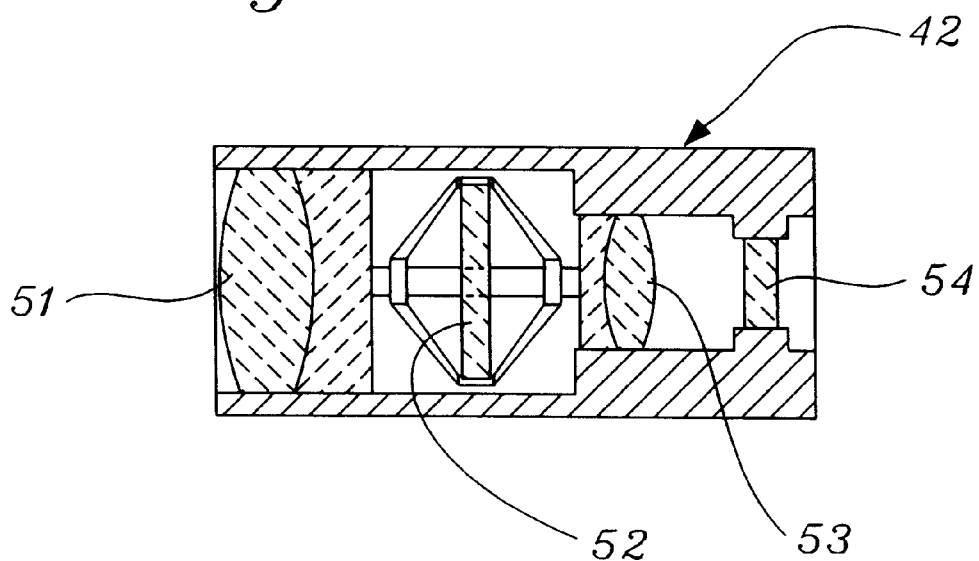
FIGS. 7a and 7b are cross-sectional views taken ninety degrees apart of the NFOV camera assembly.
Figure 7B:
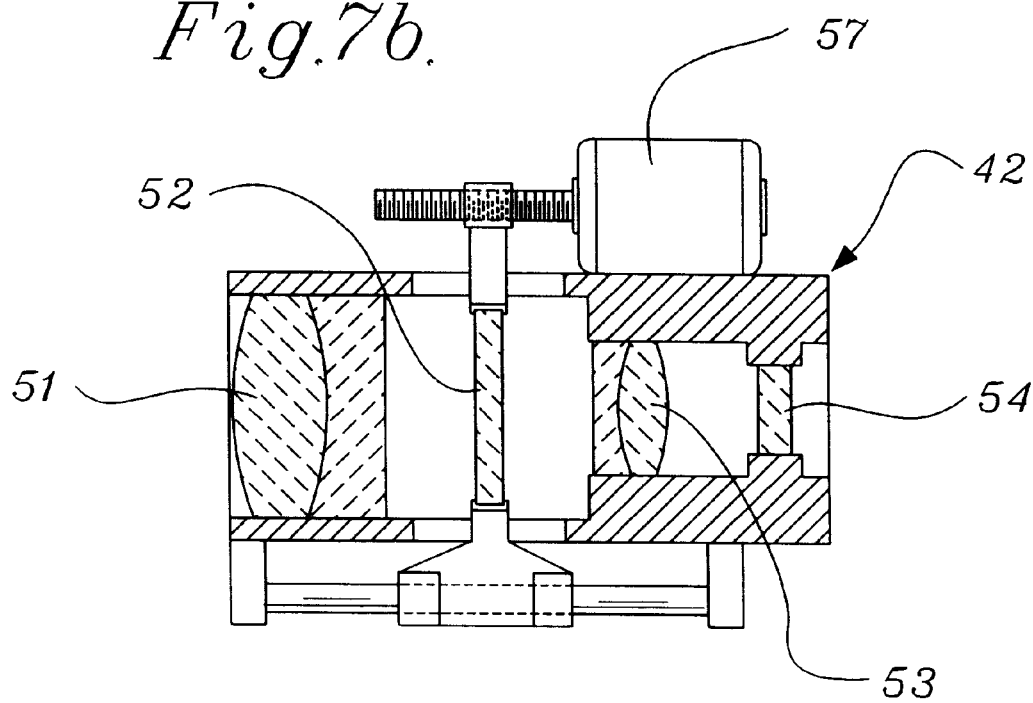
Figure 8:
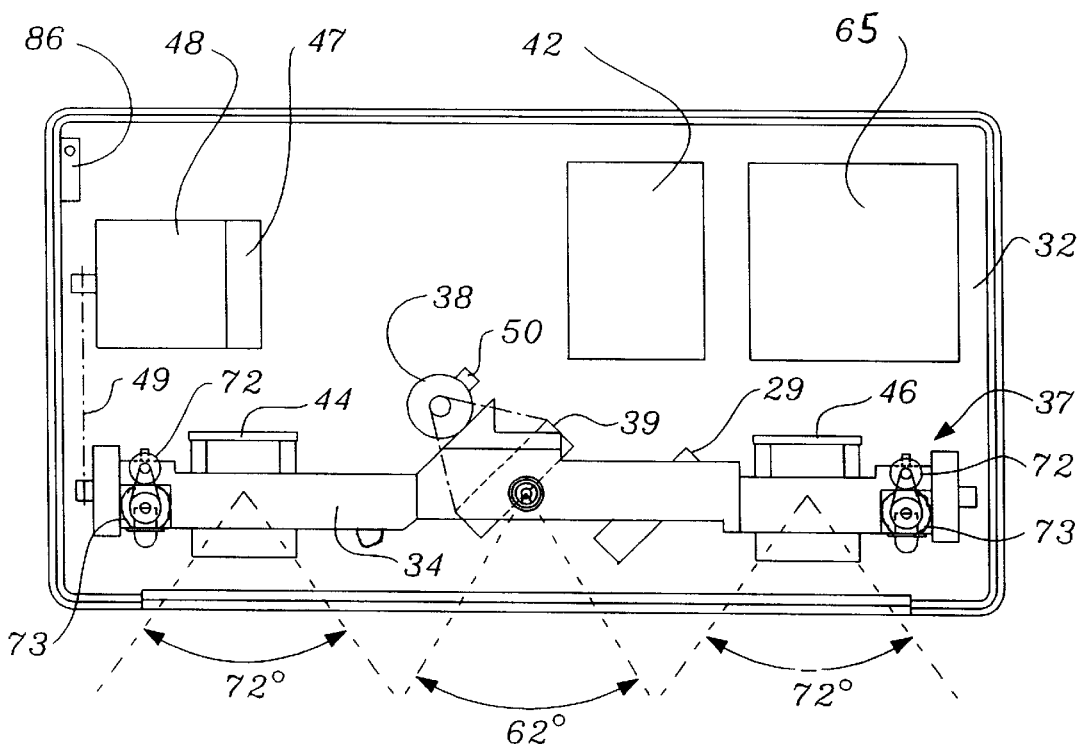
FIG. 8 is a top plan view of a second present preferred embodiment of our image steering device.
Figure 9:
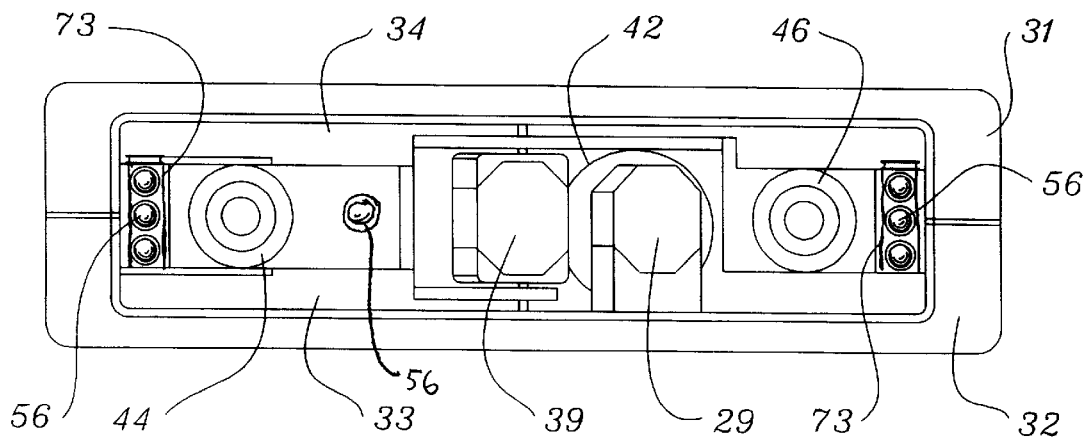
FIG. 9 is a front view of the second preferred embodiment.
Figure 10:
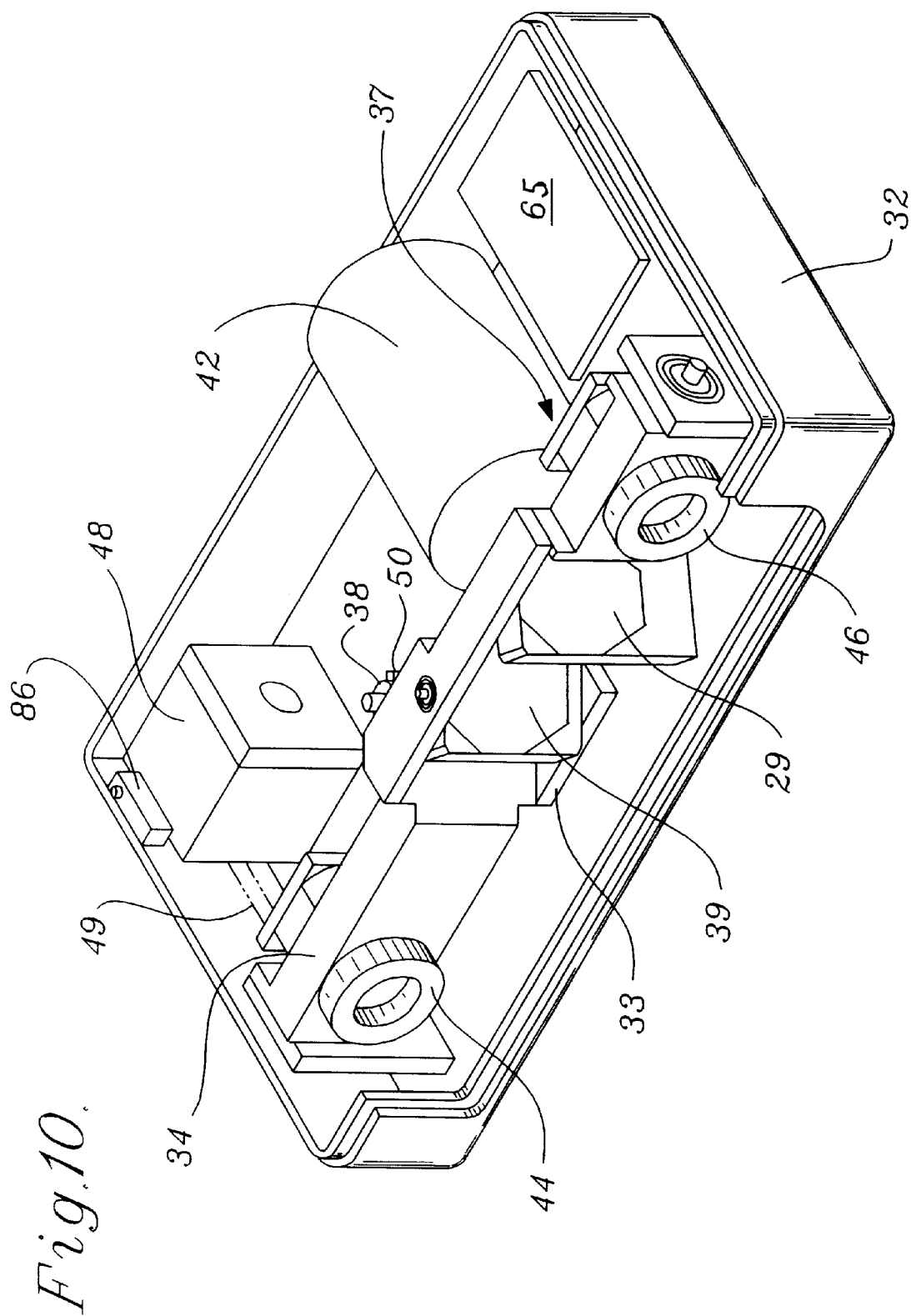
FIG. 10 is a perspective view of the second preferred embodiment.

The pan/tilt mirror 39 is positioned to receive a light beam reflected from the person or object to be identified. The light beam is reflected from pan/tilt mirror 39 into narrow field of view camera assembly 42. As shown in FIGS. 7a and 7b, our preferred camera assembly 42 has a moving lens 52 operated by focus motor 57 positioned between the two pairs of fixed lenses 51 and 53. We may optionally provide a magnifying lens behind lens 51. These lenses direct the light beam to a fixed CCD array 54 on camera module 42. The motion of these lenses is used to focus the image. The field of view for the NFOV camera defined by its associated optics is approximately 3 degrees. Thus, as the pan/tilt mirror is moved and the focus motor 57 adjusted, a small area perpendicular to the optical axis of the mirror anywhere in the work volume may be imaged The NFOV optics can be configured in various ways to resolve lens size issues, space limitations and other design considerations. The entire NFOV optics and imagery can be designed to fit inside the frame 37. In this embodiment, the entire system rotates. It is possible to use one or two additional mirrors so as to fix the location of the NFOV camera and lens on the base plate and direct the light to them via a set of mirrors as shown in the embodiment of FIGS. 8, 9 and 10. In that embodiment the additional fixed mirror 29 is provided on the frame 37 to direct the reflected light to NFOV camera assembly 42. This has the advantage in that if it is too difficult to implement the NFOV optics in the space provided, more room can be obtained by utilizing the space provided behind the frame 37. The tilt motor 48 can also be repositioned to a location behind another portion of the frame. In the second preferred embodiment of FIGS. 8, 9 and 10 the tilt motor 48 is behind the opposite end of the frame. In all other respects this embodiment is similar to the first embodiment.

Figure 11:
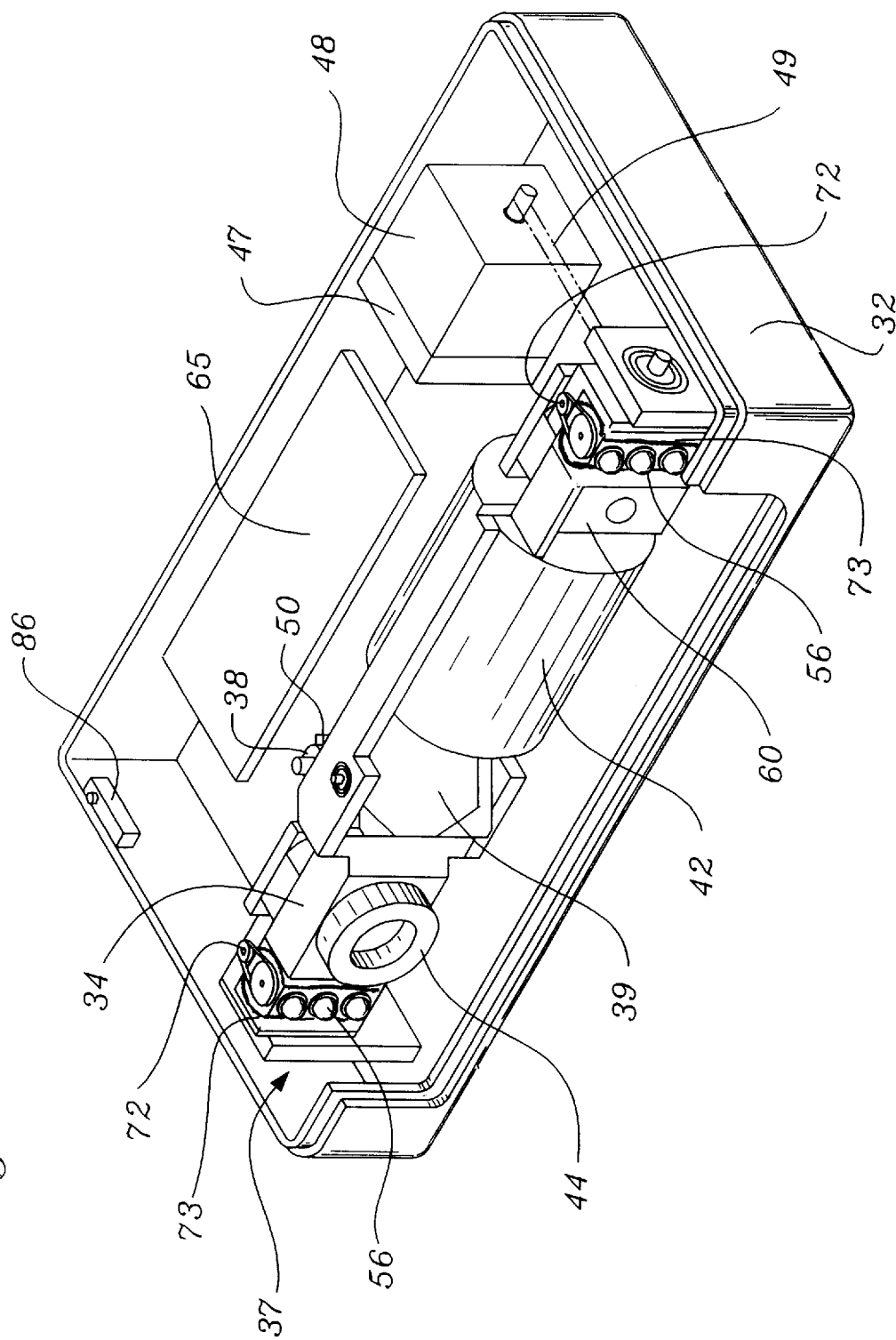
FIG. 11 is a perspective view of a third preferred embodiment.

In either embodiment one of the WFOV cameras could be removed to make a two camera system. In the first case (not shown) the camera 44 closest to the NFOV camera is removed. Now a modification to the NFOV system is used so that the NFOV camera's field of view is close (but not necessarily the same) as the remaining WFOV camera. The pan mirror is set to a nominal location (parallel to the centerline of the WFOV camera) and stereo images are acquired. For NFOV imaging the optics are switched to provide a smaller field of view. In the second case, one WFOV camera 46 is removed and replaced with a ranging device 60 as shown in FIG. 11. The ranging device may be optical, sonic, or microwave radar in nature. This device is then used in conjunction with the single WFOV camera 44 to determine the position and range to an eye and ultimately the focus. The ranging device may be fixed in the pan direction and directed in the tilt direction as shown in FIG. 11 or it may be steered by being slaved to the pan and tilt mechanism of the NFOV camera.

Figure 4:
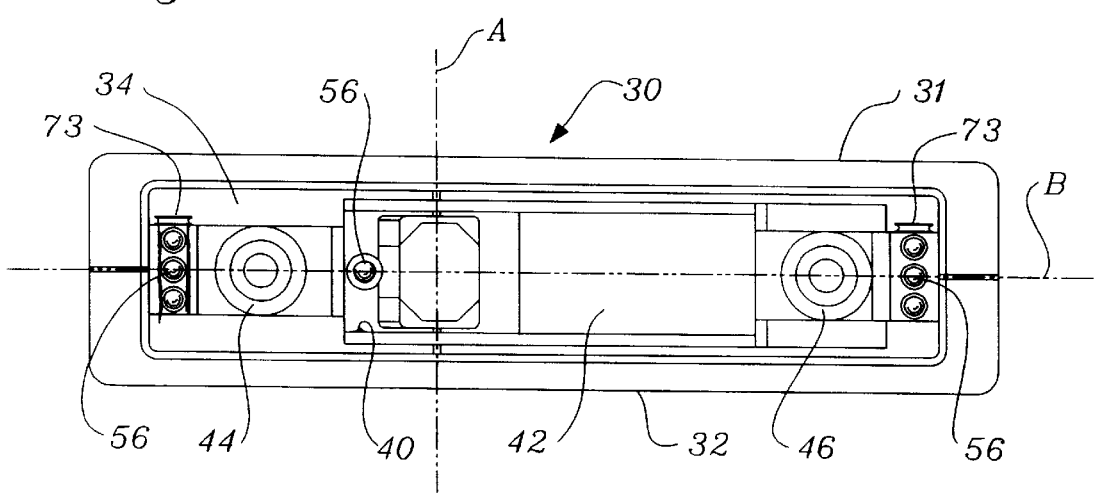
FIG. 4 is a front view of the first present preferred embodiment shown in FIG. 3.

We prefer to provide a light source in the form of several light emitting diodes 56 mounted on the frame 37 as shown in FIGS. 3 and 4. Other orientations for the light sources such as around the bodies of cameras 44 and 46, or slightly off axis to reduce reflections from glasses may be used. However, by placing the light sources on the frame 37, the required illumination power for the desired coverage may be reduced. Instead of designing the illuminator system to provide sufficient coverage over the entire working volume, a smaller amount of coverage may be chosen.

There are two separate but related illumination requirements for this system: WFOV illumination and NFOV illumination. The illuminator 56 mounted near the pan/tilt mirror 39 is used to provide illumination for the WFOV cameras 44 and 46. The beam pattern from the center illuminator need only provide a slightly larger vertical range than the vertical range of the WFOV cameras' field of view. The beam pattern's horizontal range is slightly larger than 45 degrees. The 45 degree angle corresponds to the overlap of the two WFOV cameras' field of view for stereo. As the WFOV cameras move with the tilting frame, the center illuminator also moves providing coverage to the areas being imaged by the cameras.

The two outer illuminators 56 are used for NFOV illumination. In one variation of the first embodiment, the illuminators are fixed and have a beam pattern that covers the horizontal range of 45 degrees and a vertical range slightly larger than the field of view of the NFOV camera. In this way once the tilt axis is positioned, the NFOV camera may be panned to any location and receive sufficient reflected light from the user's iris to obtain a quality iris image. In a variation of the first embodiment, the NFOV illuminators are mounted so that they can be moved in the pan direction in order to direct their beam pattern to the location defined by the pan axis of the mirror. In this implementation, a NFOV illuminator assembly 73 is located on either end of frame 37. Each of the illuminator assemblies 73 is driven by a motor 72. A mechanical means such as a 2:1 pulley (to consider mirror doubling) may be used to move the illuminators. The illuminator pan motors 72 may be stepper motors with a location indicator switch, not shown, similar to switches 28 and 40 for the tilt and pan axes. This switch is used to define a reference location from which motor motion is referenced. Similar to the WFOV discussion above, this approach allows the higher power NFOV illuminator to be concentrated in a small area and directed to the region of interest such as the user's eye location. In this case, the beam pattern can be a "spotlight" approximately 5 degrees in diameter. This concentrated size greatly reduces the power requirements as compared to illuminating the entire work volume to sufficiently image the iris. One other alternative for the NFOV illuminator would be to use a half mirror to direct the illumination though the lens and to the object of interest.

The light sources may emit any selected band of light frequencies including visible light, monochromatic infrared light, broadband infrared light or both visible light and infrared light. In our system, the light sources preferably emit infrared light. We have found infrared light to be particularly useful not only because it is invisible to the user and unobtrusive but because it penetrates eyeglasses and sunglasses more easily than visible light or colored light within the visible spectrum. A lens and diffuser (not shown) are typically used to guarantee uniform illumination from the LED's through the windows 21 and to a subject. Optical filters may be placed in the light path in front of the camera to reduce any undesirable ambient light wavelengths that corrupt the desired images. For the WFOV illuminators infrared in the 770 nm. band (+/-15 nm) are used for illumination. This wavelength was chosen since there is a natural notch in sunlight at 770 nm band due to oxygen absorption. Thus, the use of this infrared band for the WFOV illumination guarantees that the system is in control of the illumination and the effects of stray or ambient light are negligible. To take advantage of this phenomena it is necessary to equip the WFOV cameras with bandpass filters having a center frequency of 770 nm and sufficient out of band attenuation so that ambient light is blocked from the sensor.

For NFOV illumination, we have successfully used 880 nm with a bandwidth of +/-40 nm. While this illumination wavelength provides satisfactory results, we have found that broadband infrared covering from 700 nm to 900 nm produces superior results. Thus, it is preferred that the illuminators for the NFOV imaging provide broadband infrared illumination. To accompany the NFOV illumination, IR pass or IR bandpass filters can be used either as part of the NFOV camera assembly 42, or the filters can be located in window 21.

We prefer to synchronize the cameras' integration times with the light output of the illuminators. This is accomplished by effectively turning the LED's on during the time that the cameras' imagers are integrating reflected light to form images. There are different requirements for integration time and hence illumination time for the WFOV and NFOV cameras. This approach allows us to minimize the on time of the illuminators contributing to longer life, reduced internal heating, reduced power supply requirements and increased user safety factors. Alternatively, one may also use "strobe" illumination, in which the integration time is very short while the light intensity is very bright. Strobing provides the capability to freeze motion. To accomplish strobing, the LED light sources are controlled using a strobing device 63 connected to each LED as shown in chain line in FIG. 3. A synchronizer card 64 also shown in chain line can be connected to the strobing device 63 and camera 42 as well as cameras 44 and 46, for synchronizing operation of the camera with the strobing of the light source. Alternatively, the synchronizer could be connected directly to the light source if no strobing device is used. One should be aware that the strobing and synchronizing devices may be implemented by generic drive and interface hardware with software providing the strobe or synchronization functionality. These functions could also be provided by a processing unit 79 and interface 83 shown in FIG. 12.

The design of the optics requires knowledge of the distance between the lens and object, the minimum optical resolution, the magnification, and size of the imager. Taken together these parameters dictate the distance between the imaging component and the lens. Depending on the lens implementation, either an internal lens group will move to provide focus over the working range or the entire lens may have to move with respect to the imaging device to achieve proper focus. Those versed in the art will recognize that NFOV imaging component 54 may be a solid state device (such as a CCD or CMOS sensor) or may be a vidicon. The sensing array size can vary from generic industry sizes of ¼, ⅓, ½, ⅔ or 1 inch diagonal measurement. We prefer to use solid state devices and small diagonal measurements in order to reduce the overall size of the components.

The focus axis is used to adjust the position of the lens with respect to the camera's array so that the field of view that is projected on the camera array is in proper focus. In the embodiment that is shown in FIGS. 7a and 7b, two mechanically coupled sets of lenses are used so that a telephoto lens is implemented. A motor 57 and encoder (not shown) are used to control the position of the lenses which adjusts the focus to CCD camera 54 of assembly 42. Other lens configurations including a single lens could be used. For this case shown in FIGS. 7a and 7b, the single linear motion will control both the distance between lenses and the relative location of the lens closest to the array. This can further be extended to include a motor controlling the linear position of each lens with the coupled motion under software control. Furthermore, the lens arrangement could be a telecentric design, via a varifocal arrangement, or an arrangement, such as zoom and focus axes that can be adjusted to maintains a constant magnification and focus on the NFOV camera's sensing array independent of the location of the object under consideration. The zoom and focus axis can also be used to compensate for the size change of the iris in the event that the user is wearing glasses since different powers of glasses can either magnify or minify the actual iris size imaged by the NFOV camera. We prefer to provide computer control of the system using data processed from the two wide field of view cameras to direct the pan, tilt and focus axis of the NFOV camera in order to obtain a quality iris image. This system, shown as a block diagram in FIG. 12, contains the basic optical platform of the first embodiment plus all necessary interfaces and processing elements.

Figure 5:
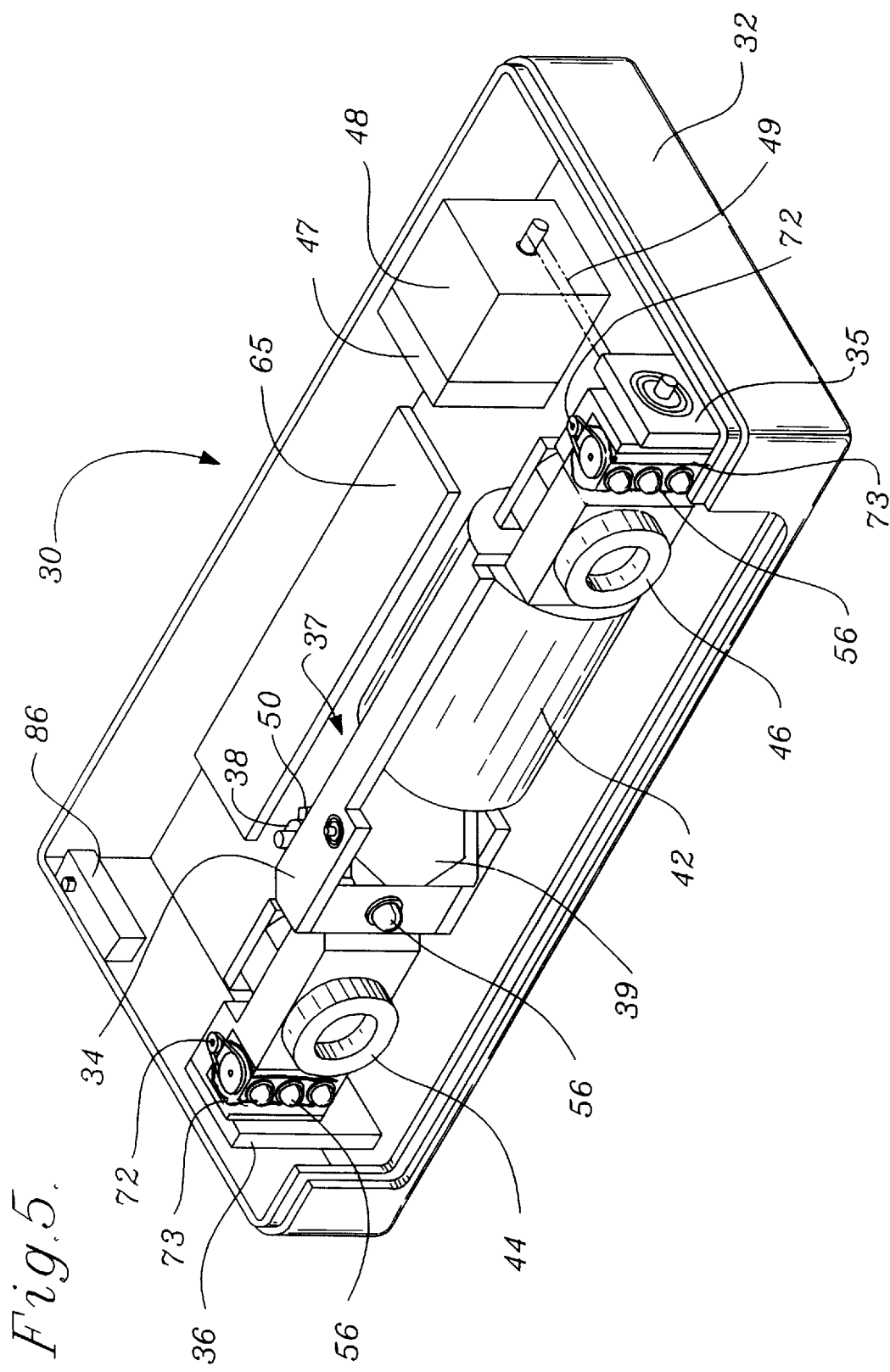
FIG. 5 is a perspective view of the embodiment shown in FIGS. 3 and 4.

Referring to FIG. 12, the two WFOV cameras 46 and 56 supply images to a WFOV stereo processing unit 77. This unit contains the computer processing hardware and software necessary to determine the location of a user's face and ultimately the {x,y,z} coordinates of the user's right or left eye. Processing unit 77 computes disparities between images from cameras 44 and 46. From the disparity image and a gray scale image, a region or point is identified in the field of view of the WFOV cameras where the subject's right eye or left eye are located. That information is then further processed to define an area of interest such as an eye. Using additional processing techniques, this data is converted into {x,y,z} coordinates relative to the WFOV camera field of view. Processing unit 77 could be a stand alone computer with appropriate interfaces and software or it could be a software process running on a larger computational unit. Coordinates and commands from the processing unit 77 are converted to the pan, tilt and focus motor positions via the Tilt/Pan/Focus and Illuminator Processing Unit 79. That unit 79 along with the Motor Control Interface 81 contains the hardware and software necessary to implement motor position control. Motor control signals from processing unit 79 pass to the Motor Control Interface 81 which in turn changes those signals to the proper power level for moving the motors. The Motor Control Interface 81 also provides any signal conditioning and level shifting for feedback signals which are processed and then sent back to processing unit 79. Once the pan, tilt and focus axes are initially positioned, the WFOV Stereo Processing Unit 77 signals the NFOV Processing and Iris Code Generation Unit 85 to use video from camera assembly 42 through Camera Interface 75. This video is processed by processing unit 85 which may signal the Tilt/Pan/Focus and Illuminator Processing Unit 79 to modify the original {x,y,z} coordinates to move to different coordinates {x',y',z'} in order to obtain a better centered image. Once a quality iris image is provided by the NFOV camera, the image is further processed to compute the iris code. The iris code may be then passed to another computational unit (not shown) to accomplish either recognition or verification. Control of the illuminators 56 is provided by processing unit 79. The Tilt/Pan/Focus and Illuminator Processing Unit 79 receives signals from either WFOV Stereo Processing Unit 77 or NFOV Processing and Iris Code Generation Unit 85 prior to image acquisition by either the WFOV cameras 44 and 46 or the NFOV camera 42. This unit plus the Illuminator Interface 83 implements any required synchronization or strobing of the illuminators. The electronic and computational functionality as well as memory for software that are described by FIG. 12 can be incorporated onto a single board, the control/processing card 65 or multiple boards that can be mounted to the base 32 shown in FIGS. 3, 5 and 11. Thus, based on the description of the electronic hardware and software functionality described above, it is possible to implement all the mechanisms, cameras, optics and electronics required for iris recognition in a 10" (deep) by 10.6" (wide) by 2" (tall) unit such as depicted in FIGS. 5 and 6. This system only requires externally supplied power for the electronics, motors, cameras and illuminators.

A calibration procedure must be used to correlate the center of the NFOV camera's field of view with pan/tilt and focus axis positions for a series of coordinates in 3 dimensional space as defined by the wide field of view. Given a set of WFOV coordinates {x,y,z} defining the position of a user's eye somewhere in the working volume in front of the cameras, a transformation, table look up, or polynomial based equation can be used to compute the coordinates of the pan, tilt and focus {p,t,f} axes that make the center of the NFOV camera's field of view coincident with x,y coordinates and in focus on the z plane.

As can be seen, the mechanisms, electronics and controls enable the compact image steering device can obtain a clear image of a small region on an object located in a volume bounded by an angle of 82 degrees in the vertical an angle of 58.5 degrees in the horizontal and a radial distance from 14 inches to 30 inches in front of the optical system. Thus, it is easily seen that this system can image the iris of an individual located in that volume provided the person is facing the device. We prefer to use a "gaze director method" to ensure that the user is looking in the correct direction, that is the front surface of their eye is in a plane perpendicular to the optical axes of the WFOV or NFOV cameras. The "gaze director method" may be explicit in that the system could control a blinking light which attracts the gaze of the user. The light would be enabled at the time that the system needs to take an image, such as after a user dips his ATM card into card dip 16 of FIG. 2. A message would be displayed on the ATM screen 4 instructing the user to look at the blinking light. A gaze director light 66 could be affixed near the top center of window 21 attached to cover 31. The gaze director light 66 could also be attached to the console 2 of an ATM as shown in FIGS. 2 and 6. Alternatively the "gaze director method" could be implicit. In this case, the user dips his card into card dip 6 of FIG. 1. The user naturally looks at the screen 4 to receive instructions for the transaction. The placement of the optical system in volume 24 is such that the user's eyes are properly aligned with the optical axes of the imaging components thereby removing the need for a blinking light.

At the start of a transaction, the tilt axis is positioned for a nominal height (i.e. to accommodate normal height users). Nominal height may be defined by averaging the last N transactions, in this way cultural differences can be compensated for automatically. Depending on the scene, the tilt axis will move upward (for the tall users) or downward (for short or wheel chair bound users). It is envisioned that a discrete number of positions may be used to define the WFOV elevation angles, based on anthropometric analysis of the population, field of view of the lens and overlap of the field of view at the discrete locations. Once the face and eye have been located, the pan/tilt axis will be used to direct the optical axis of the NFOV camera to the user's eye. Note that the tilt motion is not discrete in the NFOV operation, but is controlled in response to information obtained from images produced by processing data from the WFOV cameras.

In the simplest case where the user is generally standing still, one may consider that a WFOV image is acquired, the data is processed and then passed to the controller in order to position the NFOV camera. In order to minimize motion time and control settling time, all three axes (pan, tilt and focus) can perform simultaneous motion; that is, they start and stop simultaneously.

A more complicated scenario occurs when the position of the object of interest, namely the eye, in the WFOV may be moving. There is a requirement that the NFOV camera track the trajectory seen by the WFOV. This is so that when motion ceases, a quality image may be acquired via the NFOV camera and optics. By tracking the eye, the optics directing light to the NFOV camera are aligned so that when it is desired to obtain an iris quality image little or no additional motion may be required.

Various methods may be used for eye tracking. In the simplest approach, the WFOV provides the initial {x,y,z} coordinates which are used to position the pan, tilt and focus axes. The NFOV processing unit receives and evaluates the image in terms of the position of the center of the iris with respect to the image. The NFOV then computes changes in the pan and tilt axes so that the center of the eye is essentially kept in the center of the image. When a well focused image that meets the centering criterion is obtained it is then used to compute the iris code. This first scenario compensates quite well for natural motion of the eyes and small movements, Yet, it does not compensate for motions that move the eye outside the focus range. When the eye moves outside the focus range or is beyond boundaries defined by the NFOV processing, the system reverts to WFOV processing to find the eye and then proceeds to NFOV processing.

An enhancement to the system that can reduce the perceived overall transaction time is the inclusion of a proximity detector 99 on the cover 31 or the base 32 as shown in FIG. 6. The proximity detector is used to detect the presence of a user entering the working volume of the system. Once a user enters the volume, the system begins to track the user's eye so that the pan, tilt and focus axes are positioned to acquire an iris image. This approach allows the system to get multiple images of the user's eye and actually perform an identification of the person before they even dip their card in the ATM. While the WFOV cameras 44 and 46 along with illuminator 56 and WFOV Stereo Processing Unit 77 could be programmed to perform the function of detecting a user entering the work volume, the use of the proximity detector allows the system to be in an idle state, conserving power and the lifetime of various components.

To accomplish the tracking described above, a more complicated approach than previously discussed is required. In this case, the x,y,z coordinates from analysis of the WFOV images are sent to the NFOV controller at some uniform sample rate (such as every 100 ms). A continuous path algorithm such as described in *Robotic Engineering An Integrated Approach*, by Klafter, Chmielewski and Negin (Prentice Hall, 1989) could be used to provide intermediate sets of {p,t,f} set points to the axis so that the axes track the user's motion as they approach the ATM. This type of tracking allows the pan, tilt and focus axes to be continually positioning the NFOV camera's field of view on the user's eye. Thus, multiple NFOV images could be obtained and used for identification purposes. The key advantage of this approach is to reduce the perceived time that a user experiences in using iris recognition.

It is important to recognize that as the NFOV axes move, the associated imager may not have sufficient time to perform the required integration to get a non-blurred image. Additionally, depending on the camera used (interlaced or progressive scan) there may be field to field displacement or horizontal displacement of the image. Thus, it is easily seen why the WFOV camera provides the information necessary for directing the NFOV stage. It should be noted, that certain eye tracking algorithms (such as those based on specularity or iris configuration or pattern matching) may be capable of providing sufficient information (even if the image is slightly blurred due to focus or exhibits some blur caused by motion) to provide a reasonable estimate of the eye location in the NFOV camera. Thus, it is conceptually possible to use the WFOV data for coarse movement and the processed NFOV data (during motion) as additional information for finer resolution. This fusion of data can provide a better estimate than one WFOV camera image alone in positioning the NFOV image to acquire a quality iris image.

To acquire a quality iris image, the NFOV axes must settle to a point where the residual motion is less than that which can be detected by the imager. In general the settling time criterion is to settle within one field time (for interlaced camera operation) and with an amplitude of +/−½ pixel. Once settling occurs, any remaining images must be purged from the imager (typically there is a delay between an image integrated and the readout via RS170 or digitally) and the proper integration time allowed to acquire a non blurred image. See *Robotic Engineering An Integrated Approach* for a timing scenario. Control of image acquisition with respect to settling time can be accomplished in a number of ways, the simplest being a time delay which occurs after the cessation of motion until a good image is captured. Additionally, by synchronizing the cameras' integration time with the control of the illuminators, that is providing bright illumination for a short period during the integration time, can quickly acquire an image and minimize motion blur.

Since minimizing the settling time of the mechanical stages is of importance in obtaining a quality iris image with the minimal delay, the control strategy for motion control requires careful consideration. The mechanism design requires a high mechanical bandwidth so that transient responses quickly decay. Further reduction in settling time can by achieved by tailoring the frequency content of the velocity, acceleration and jerk profiles of the motors during motion so the frequency content do not excite or come near the natural resonances of the system and that the signals appear to be band limited. This type of drive signal minimizes settling time and hence any delay associated with image acquisition after mechanical motions.

The focus axes of the NFOV system is controlled in an open loop fashion. The open loop procedure provides a good compromise among speed of execution, quality of focus, robustness and cost of implementation. In this case, the {z} coordinate from stereo processing defines the focus axis position via table look up or other means so that the lens properly focuses the NFOV camera on the object of interest. The table look up is a result of a calibration process performed during the manufacturing process and its data is part of block 79 of FIG. 12. This open loop approach works well since the NFOV lens is designed to have a large depth of focus (a minimum value of +/−0.5 inch). Alternatively, a closed loop focus method could also be used. For this latter case, NFOV video would be processed by a focus evaluation algorithm executing in block 85 of FIG. 12. The focus evaluation algorithm would generate a figure of merit defining if the axis was in focus. From the figure of merit commands would be generated that tell the focus axis to move forward or backward. These commands would be sent to block 79 which in turn would cause the focus axis to move. After motion ceases, a new image would be acquired. The process would repeat in a closed loop form until a properly focused image was obtained.

Either or both WFOV cameras 44 or 46 may be used to take a security images when the iris identification system is idle. Furthermore, since the system includes IR illumination and the ability to tilt, the surveillance capabilities are enhanced over those of a fixed mount camera since the field of view may be modified by selection one of the cameras or moving the tilt axis. Thus, the compact image steering device can also provide additional functionality and a cost reduction to the financial transaction machine. This surveillance mode could also be initiated by the proximity detector 99 shown in FIG. 6.

It is essential to ensure that the integrity of the acquired images as well as the data passed to the ATM has not been compromised. Thus, in our preferred embodiment, the unit will be enclosed in a security envelope which will be used to detect unwelcome intrusion and render the system useless. This is especially important in applications where large value transactions might occur such as in an ATM. The envelope will utilize at least one chassis intrusion detector or switch 86 shown in FIG. 5 and FIG. 11. Switch 86 will signal the processing/control board to return to a non-functioning state similar to that found during assembly. This non-functioning state will essentially delete key software routines related to generating and retrieving iris codes as well as all camera operation. It may also delete special battery backed up ram tables which include security or encryption information. Thus, if an intruder does gain access to the system he cannot inject video nor obtain iris codes, or even operate the system thereby making his attack useless.

The security envelope will be in effect only after system software is loaded and enabled. The security envelope will remain in effect until intrusion is detected or the system software is reloaded using a special protocol.

Although we have shown certain present preferred embodiments of our compact image steering and focusing device and methods of using that device, it should be distinctly understood that our invention is not limited thereto but may be variously embodied within the scope of the following claims.

We claim:

1. A compact imaging device comprising:
   a. a base;
   b. at least one upright attached to the base;
   c. a frame attached to the at least one upright in a manner so that the frame can rotate about a tilt axis which intersects the upright;
   d. a pan/tilt mirror rotatably attached to the frame so that the mirror can be rotated around a pan axis which pan axis intersects a plane through the tilt axis;
   e. a pan motor connected to the mirror in a manner to be able to rotate the mirror about the pan axis;
   f. a first camera and first camera lens attached to the frame and in optical alignment with the pan/tilt mirror; and
   g. at least one second camera and second camera lens attached to the frame.

2. The compact image steering device of claim 1 also comprising a fixed mirror attached to the base and positioned in an optical path between the pan/tilt mirror and the first camera.

3. The compact image steering device of claim 1 wherein the at least one second camera is comprised of two cameras separated by a fixed horizontal distance.

4. The compact image steering device of claim 3 wherein the two cameras have overlapping fields of view.

5. The device of claim 4 also comprising an image processor connected to the second and third cameras which receives images of a subject in the overlapping fields of view from both the second camera and the third camera and processes those images to determine an x, y, z coordinate position relative to the second and third cameras for a point on the subject from which point the first camera can be directed.

6. The device of claim 5 also comprising:
   a. a tilt motor connected to the frame;
   b. a focus motor connected to the first camera lens; and
   c. a controller connected to the image processor, the pan motor, tilt motor and the focus motor which activates the pan motor and tilt motor to position the pan/tilt mirror and the focus motor so that light reflected from the point on the subject to the pan/tilt mirror will be reflected by the pan/tilt mirror to the first camera.

7. The device of claim 6 wherein the image processor is programmed to compare images from the second camera to determine if the subject is moving, calculate a motion path of a moving subject and direct the pan, tilt and focus motors to compensate for such motion.

8. The device of claim 6 also comprising a gaze director connected to the controller.

9. The device of claim 8 wherein the gaze director is connected in a manner to allow the gaze director to be placed at a location remote from the base.

10. The device of claim 8 wherein the remote location is on an automated teller machine.

11. The compact image steering device of claim 1 also comprising at least one illuminator attached to the frame.

12. The compact image steering device of claim 1 also comprising a cover attached to the base and surrounding the frame, pan/tilt mirror, pan motor and cameras.

13. The compact image steering device of claim 1 wherein the device has a depth not less than 8 inches, a width not greater than 10.6 inches and a height not greater than 2 inches.

14. The device of claim 1 wherein the pan motor is a linear drive motor.

15. The device of claim 14 also comprising a belt drive connected between the pan motor and the frame.

16. The device of claim 1 also comprising at least one light source which can emit at least one of infrared light, visible light, a select band of frequencies, or both infrared and visible light, the at least one light source being positioned so that light emitted from the light source will be reflected from a subject to the pan/tilt mirror.

17. The device of claim 16 wherein the light source is a strobe light.

18. The device of claim 16 also comprising a synchronizer connected to the camera and the light source for synchronizing the operation of the camera with strobing of the light source.

19. The device of claim 16 also comprising a strobing device connected to the light source.

20. The device of claim 16 wherein the light source is a light emitting diode or array of light emitting diodes.

21. The device of claim 16 also comprising a motor connected to the at least one light source.

22. The device of claim 1 also comprising at least one limit switch connected to the pan motor.

23. The device of claim 1 also comprising at least one position sensor mounted on one of the frame and the stand in a manner to determine positions of at least one of the pan/tilt mirror and the frame.

24. The device of claim 1 wherein the pan motor is a one of a DC motor and a stepper motor.

25. The device of claim 21 also comprising a controller connected to the motor and a position sensor connected to the controller wherein the position sensor provides signals to the controller and the controller supplies the motor with corresponding drive signals.

26. The device of claim 1 also comprising a range finder connected to the base and positioned to determine a distance of a subject from the at least one second camera.

27. The device of claim 1 wherein the first camera lens is selected from the group of lenses consisting of a fixed focus lens, telecentric lens, varifocal lens and zoom lens.

28. The device of claim 1 also comprising a top removably connected to the base and a detector connected to at least one of the top and the base to detect movement of the top relative to the base.

29. The device of claim 28 also comprising at least one image processor connected to the cameras and the detector, the image processor containing a program which will disable the image processor upon receipt of a signal from the detector.

30. The device of claim 29 wherein the program will erase selected software modules or routines in the image processor upon receipt of a signal from the detector.

31. The device of claim 1 also comprising a proximity detector positioned relative to the base to detect a person approaching the device.

32. The device of claim 31 also comprising:
   a. at least one illuminator positioned to emit light that will be reflected from a subject to the pan/tilt mirror; and
   b. a controller connected to the proximity detector, the pan motor and the at least one illuminator which controller changes the at least one illuminator and the pan motor from a low power state to a higher power state.

33. The device of claim 1 also comprising a top connected to the base wherein the top and base are sized and configured to enclose the upright, frame, pan/tilt mirror, pan motor, camera and lenses.

34. The device of claim 1 wherein the first camera creates an image in response to a selected wavelength of light and the second camera creates an image in response to a different selected wavelength of light.

35. The device of claim 1 also comprising at least one optical filter placed in an optical path of at least one of the first camera and the second camera.

36. The device of claim 35 wherein the at least one optical filter has a center frequency of from 700 nm to 900 nm.

37. The device of claim 1 wherein the first camera lens has zoom and focus axes that can be adjusted to compensate for a size change of an iris of a user who is wearing glasses.

38. The compact imaging device of claim 11, further comprising an illuminator assembly connecting the illuminator to the frame.

39. The compact imaging device of claim 38, wherein the illuminator assembly is rotatably connected to the frame such that the illuminator assembly may rotate in the pan direction independent of the frame.

* * * * *